United States Patent
Corvasce et al.

(10) Patent No.: US 6,539,996 B1
(45) Date of Patent: *Apr. 1, 2003

(54) TIRE WITH SIDEWALL RUBBER INSERT

(75) Inventors: Filomeno Gennaro Corvasce, Mertzig (LU); Georges Marcel Thielen, Schouweiler (LU); Marc Jules Alexis Henoumont, Habay-la-Neuve (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 148 days.

This patent is subject to a terminal disclaimer.

(21) Appl. No.: 09/723,664

(22) Filed: Nov. 28, 2000

Related U.S. Application Data

(62) Division of application No. 09/274,173, filed on Mar. 23, 1999, now Pat. No. 6,202,726.

(51) Int. Cl.[7] .......................... B60C 1/00; B60C 15/06; B60C 17/00
(52) U.S. Cl. ................ 152/517; 152/547; 152/557; 524/52
(58) Field of Search ................. 152/517, 541, 152/547, 555, 557; 524/52

(56) References Cited

U.S. PATENT DOCUMENTS

| | | |
|---|---|---|
| 4,005,054 A | 1/1977 | Bonnefon et al. |
| 4,067,373 A | 1/1978 | Delobelle et al. |
| 4,857,571 A | 8/1989 | Reiter et al. |
| 5,374,671 A | 12/1994 | Corvasce et al. |
| 5,545,680 A | 8/1996 | Corvasce et al. |
| 5,672,639 A | 9/1997 | Corvasce et al. |
| 6,036,800 A | 3/2000 | Corvasce et al. |
| 6,202,726 B1 * | 3/2001 | Corvasce et al. ........... 152/517 |

FOREIGN PATENT DOCUMENTS

| | | |
|---|---|---|
| EP | 0795581 | 9/1997 |
| EP | 0867471 | 9/1998 |
| EP | 0906838 | 4/1999 |

OTHER PUBLICATIONS

European Search Report.

* cited by examiner

Primary Examiner—Adrienne C. Johnstone
(74) Attorney, Agent, or Firm—Henry C. Young, Jr.

(57) ABSTRACT

A pneumatic tire has a sidewall rubber insert axially inward of at least one carcass ply. Such insert may, for example, be an apex extending radially outward from the bead core region of the tire into the sidewall. Alternatively, it may be positioned higher in the sidewall portion of the tire and away from the bead core. Such insert is a rubber composition containg a dispersion of an ultra high molecular weight polyethylene and a dispersion of a starch composite.

18 Claims, 1 Drawing Sheet

TIRE WITH SIDEWALL RUBBER INSERT

This is a Divisional of Application No. 09/274,173, filed on Mar. 23, 1999, now U.S. Pat. No. 6,202,726 B1.

Field

This invention relates to a pneumatic tire having a rubber insert in its sidewall axially inward of at least one carcass ply. Such insert may be, for example, an apex in extending radially outward from a bead core of a tire into its sidewall. Alternatively, the insert may be positioned higher in the sidewall portion of the tire and away from the bead core. Such insert is a rubber composition containing a dispersion of an ultra high molecular weight polyethylene and a dispersion of a starch composite.

BACKGROUND

It is sometimes desired to provide a tire having a sidewall of a relatively high stiffness to enhance a tire's handling, for example its cornering stability, when mounted on a rigid rim as a part of a wheel of a vehicle. For example, see U.S. Pat. Nos. 4,024,901 and 4,067,373.

Often, a resin is added to an apex portion of a tire sidewall to make it stiffer. However, addition of a resin for such purpose, while increasing hardness for the rubber composition, may also adversely affect the rubber composition's other desirable properties such as, for example, its rebound and permanent set properties.

Another method of increasing hardness for a tire apex is to increase its reinforcing filler content (e.g.: its carbon black content). However, increasing the carbon black content for such rubber composition, while increasing its hardness, may adversely affect physical properties such as, for example, its hysteresis and, therefore, its heat build-up property and also may disadvantageously increase its stiffness softening with strain history property.

The stiffness softening property relates to a comparative difference (e.g.: a reduction) between a first force (MPa) needed for application of about a one percent shear strain at 100° C. to the rubber sample and a second force (MPa) needed for the same shear strain; wherein an intermediate and significantly greater shear strain (e.g.: about a 50 percent shear strain) is applied to the sample with an accompanying relaxation of the sample to its original size after each of said first and intermediate shear strain applications. If there is only a minimal, if any, decrease in the second force, then it may be said that there is little, if any, stiffness softening of the cured rubber sample.

In practice, a low stiffness softening of the rubber composition for the insert is desired.

In the description of this invention, a stiffness of a cured rubber composition is a characteristic similar to modulus in a sense that it is measured in terms of MPa and relates to a force required to obtain a prescribed strain, or elongation, of a rubber composition.

In practice, it is desired that a rubber composition for the insert have a relatively high stiffness, or modulus, at an elongation of 100 percent. While of a somewhat lesser significance, it is also desired that it also have a relatively high modulus at a larger elongation of 300 percent.

For this invention, variation in methodology of increasing stiffness for a tire sidewall insert is desired.

In particular, it is desired herein to provide a tire with a sidewall having an insert which has a relatively high hardness represented as having a Shore D hardness (23° C.) in a range of about 35 to about 50, yet also having a Hot Rebound value at 100° C. of about 65 to about 80 in order to reduce heat generation in the rubber composition under working conditions as a tire sidewall insert.

In practice, for the relatively hard rubber compositions for the insert of this invention, the hardness values may be desired to be recited in terms of a Shore D hardness rather than a Shore A hardness.

Historically, a tire is a composite of numerous components each serving a specific and unique function and cooperatively functioning to produce a desired tire performance. In one aspect, a tire carcass may contain one or more reinforcing carcass plies. A carcass ply is typically a continuous layer of rubber-coated parallel cords which extend from bead to bead and functions as a reinforcing element of the tire. The plies are usually turned up around the bead, thereby locking the bead into the carcass. Such carcass reinforcing plies are well known to those having skill in such art.

In one aspect of the invention, a tire sidewall insert may be a tire apex. The term "apex" as used herein refers to a rubber wedge located primarily in the lower sidewall region extending radially outward from the tire's bead core into the sidewall of the tire, usually between a carcass ply and its turn-up portion. An apex portion of a tire is well known to those skilled in such art.

BRIEF DESCRIPTION OF THE DRAWING

The tire sidewall insert may be described by way of example and with reference to the accompanying drawing in which.

DISCLOSURE AND SUMMARY OF THE INVENTION

Figure 1:
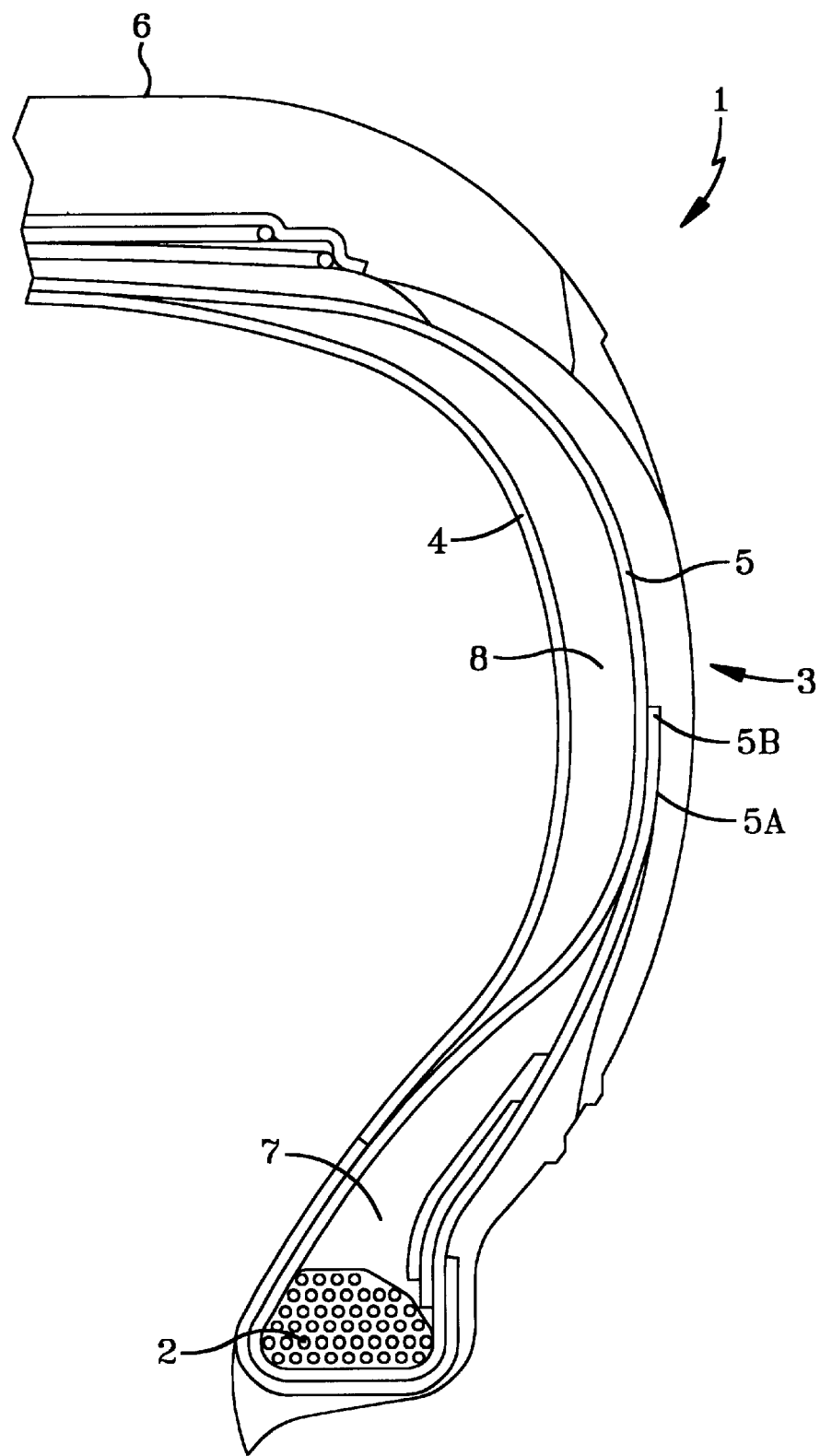
FIG. 1 is a partial cross-sectional view of a tire with a first insert of a rubber composition in its sidewall region shown as an apex adjacent to a carcass ply and to a bead core and a second insert in its sidewall region spaced apart from the bead core.

In accordance with this invention, a toroidally-shaped tire is provided which is comprised of two spaced-apart relatively inextensible bead cores, a circumferential tread designed to be ground-contacting, sidewalls extending from said bead cores to said tread and a carcass, which contains said bead cores and sidewalls, comprised of at least one cord reinforced ply supporting said tread and extending from bead core to bead core; wherein an insert of a rubber composition is juxtapositioned to at least one of said carcass plies in the sidewall region of the tire characterized that said insert is a rubber composition comprised of, based upon 100 parts by weight of elastomer(s);

(A) 100 phr at least one elastomer selected from homopolymers and copolymers of conjugated diene composition is hydrocarbons having from 4 to 6 carbon atoms and copolymers of conjugated hydrocarbons having from 4 to 6 carbon atoms and styrene and alpha-methylstyrene, preferably styrene;

(B) about 5 to about 50, alternatively about 15 to about 40, phr of a particulate ultra high molecular weight polyethylene having a number average molecular weight average in a range of about 4.5 to about 8, alternatively about 5 to 8, million and having a melting point according to ISO Method No. 306 in a range of about 130° C. to about 150° C., dispersed within said rubber composition of said insert;

(C) about 5 to about 40, alternatively about 5 to about 30, phr of a particulate starch/plasticizer composite dispersed within said rubber composition of said insert;

(D) about 10 to about 50 phr of at least one reinforcing filler selected from carbon black, precipitated silica, aluminosilicate and modified carbon black having silanol units on its surface dispersed within said rubber composition of said insert;

(E) a coupling agent for said silica, aluminosilicate, modified carbon black and starch composite, as the case may be, having a moiety reactive with silanol units contained on the surface of the silica, aluminosilicate and said modified carbon black and hydroxyl units contained in said starch composite, as the case may be, and another moiety interactive with said elastomer(s); wherein said starch is composed of amylose units and amylopectin units in a ratio of about 15/85 to about 35/65, alternatively about 20/80 to about 30/70, and has a softening point in a range of about 180° C. to about 220° C.; wherein said starch/plasticizer composite has a softening point in a range of about 110° C. to about 170° C. and where the plasticizer is a polymeric plasticizer having a softening point of less than 160° C.; wherein said softening points are determined according to ASTM No. D1228.

In further accordance with this invention, said insert rubber composition, in its sulfur-vulcanized state, has a Shore D hardness value at 23° C. in a range of about 35 to about 50, a 100 percent modulus at 23° C. in range of about 3 to about 9 MPa and a Hot Rebound value at 100° C. in a range of about 50 to about 85.

In additional accordance with this invention, said insert is an apex wherein said apex extends radially outward from said bead core into an associated sidewall region of the tire. In practice, said apex may have substantially a shape of an entruncated crescent with its entruncated portion juxtapositioned to a bead core.

Alternatively, said insert may be juxtapositioned to and axially inward of a at least one carcass ply in the sidewall region of the tire and spaced apart from said bead core.

In practice, it has been observed that use of a starch/plasticizer in combination with the ultra high molecular weight polyethylene (UHMWPE) inclusions (micro dispersions) can be used to obtain a higher modulus of the rubber composition at intermediate strains (e.g.: 100 percent elongations) believed to be due, at least in part, to increased elastomer/UHMWPE/starch composite interactions.

For the purposes of this invention, it is believed that a significant contribution of micro inclusion, or dispersion, of the ultra high molecular weight polyethylene (UHMWPE) is to promote a significantly higher modulus of the rubber composition at relatively large strains (e.g.: 100 percent elongation).

The benefit of such properties, namely the relatively high 100 percent modulus values as well as desirable high hot rebound value, relatively high Shore D hardness and low stiffness softening for the sidewall insert and apex of this invention, is to provide a tire with one or more of enhanced handling characteristics.

In practice, the said reinforcing filler may be comprised of, for example, about 10 to about 50 phr of carbon black and about 20 to about 30 phr of precipitated silica and/or aluminosilicate. Alternatively, such reinforcing filler may be comprised of, for example, (i) carbon black alone, (ii) about 20 to about 30 phr of carbon black and about 10 to about 60 phr of precipitated silica and/or aluminosilicate and about 5 to about 20 phr of said starch composite, (iii) about 30 to about 50 phr of carbon black and about 10 to about 30 phr of said starch composite or (iv) about 15 to about 30 phr of carbon black, about 20 to about 40 phr of modified carbon black and about 5 to about 30 phr of starch composite.

It is to be appreciated that a coupling agent is to be typically used in combination with said precipitated silica, aluminosilicate, with said modified carbon black and with said starch composite to aid in coupling such fillers to the elastomer(s) and to, thus, enhance their elastomer reinforcing effect. Such couplers are those which have a moiety reactive with the surface of the silica, aluminosilicate and modified carbon black (e.g. with silanol groups on the surface thereof) or with surface of the starch composite (e.g. hydroxyl groups) and another moiety interactive with the elastomer(s).

The philosophy of utilizing coupling agents for such purpose is well known to those having skill in such art.

For the starch composite, it is to be appreciated that starch has previously been suggested for use in rubber products, including starch/plasticizer composites. For example, see U.S. Pat. No. 5,762,639.

Starch by itself, typically has a softening point of about 200° C. or above and is considered herein to have a somewhat limited use in many rubber products, primarily because rubber compositions are normally processed by preliminarily blending rubber with various ingredients at temperatures in a range of about 140° C. to about 170° C., usually at least about 160° C., and sometimes up to 180° C. which is not a high enough temperature to cause the starch (with softening temperature of at least-about 200° C.) to effectively melt and efficiently blend with the rubber composition. As a result, the starch particles tend to remain in individual domains, or granules, within the rubber composition rather than as a more homogeneous blend.

Thus, it is considered herein that such softening point disadvantage has rather severely limited the use of starch as a filler, particularly as a reinforcing filler, for many rubber products.

It is considered herein that a development of a starch/plasticizer composition, or compositions, with a softening point significantly lower than that of the starch alone, may allow the starch to be more easily mixed and processed in conventional elastomer processing equipment.

Starch is typically represented as a carbohydrate polymer having repeating units of amylose (anhydroglucopyranose units joined by glucosidic bonds) and amylopectin, a branched chain structure, as is well known to those having skill in such art. Typically, starch is composed of about 25 percent amylose and about 75 percent amylopectin (*The Condensed Chemical Dictionary, Ninth Edition* (1977), revised by G. G. Hawley, published by Van Nostrand Reinhold Company, page 813). Starch can be, reportedly, a reserve polysaccharide in plants such as, for example, corn, potatoes, rice and wheat as typical commercial sources.

It is considered herein that use of a starch/plasticizer composition, or compositions, with a softening point significantly lower than that of the starch alone, can allow the starch to be more easily mixed and processed in conventional elastomer processing equipment.

In the practice of this invention, the starch/plasticizer composite may be desired to be used, for example, as a free flowing, dry powder or in a free flowing, dry pelletized form. In practice, it is desired that the synthetic plasticizer itself is compatible with the starch and has a softening point lower than the softening point of the starch so that it causes the softening of the blend of the plasticizer and the starch to be lower than that of the starch alone. This phenomenon of blends of compatible polymers of differing softening points having a softening point lower than the highest softening point of the individual polymer(s) in the blend is well known to those having skill in such art.

For the purposes of this invention, the plasticizer effect for the starch/plasticizer composite, (meaning a softening point of the composite being lower than the softening point of the starch), can be obtained through use of a polymeric plasticizer such as, for example, poly(ethylenevinyl alcohol) with a softening point of less than 160° C. Other plasticizers and their mixtures are contemplated for use in this invention, provided that they have softening points of less than the softening point of the starch, and preferably less than 160° C., which might be, for example, one or more copolymers and hydrolyzed copolymers thereof selected-from ethylene-vinyl acetate copolymers having a vinyl acetate molar content of from about 5 to about 90, alternatively about 20 to about 70, percent, ethylene-glycidal acrylate copolymers and ethylene-maleic anhydride copolymers. As hereinbefore stated, hydrolyzed forms of copolymers are also contemplated. For example, the corresponding ethylene-vinyl alcohol copolymers and ethylene-acetate vinyl alcohol terpolymers may be contemplated so long as they have a softening point lower than that of the starch and preferably lower than 160° C.

In general, the blending of the starch and plasticizer involves what are considered or believed herein to be relatively strong chemical and/or physical interactions between the starch and the plasticizer.

In general, the starch/plasticizer composite has a desired starch to plasticizer weight ratio in a range of about 0.5/1 to about 4/1, alternatively about 1/1 to about 2/1, so long as the starch/plasticizer composition has the required softening point range, and preferably, is capable of being a free flowing, dry powder or extruded pellets, before it is mixed with the elastomer(s).

Representative examples of synthetic plasticizers are, for example, poly(ethylenevinyl alcohol), cellulose acetate and diesters of dibasic organic acids, so long as they have a softening point sufficiently below the softening point of the starch with which they are being combined so that the starch/plasticizer composite has the required softening point range.

Preferably, the synthetic plasticizer is selected from at least one of poly(ethylenevinyl alcohol) and cellulose acetate.

For example, the aforesaid poly(ethylenevinyl alcohol) might be prepared by polymerizing vinyl acetate to form a poly(vinylacetate) which is then hydrolyzed (acid or base catalyzed) to form the poly(ethylenevinyl alcohol). Such reaction of vinyl acetate and hydrolyzing of the resulting product is well known to those skilled in such art.

For example, vinylalcohol/ethylene (60/40 mole ratio) copolymers can be obtained in powder or pellet forms at different molecular weights and crystallinities such as, for example, a molecular weight of about 11700 with an average particle size of about 11.5 microns or a molecular weight (weight average) of about 60,000 with an average particle diameter of less than 50 microns. In an alternative, they can be compacted into pellets and then blended with starch at an elevated temperature above the melting point of the copolymer itself.

Various blends of starch and ethylenevinyl alcohol copolymers can then be prepared according to mixing procedures well known to those having skill in such art. For example, a procedure might be utilized according to a recitation in the patent publication by Bastioli, Bellotti and Del Trediu entitled "A Polymer Composition Including Destructured Starch An Ethylene Copolymer", U.S. Pat. No. 5,403,374.

Other plasticizers might be prepared, for example and so long as they have the appropriate Tg and starch compatibility requirements, by reacting one or more appropriate organic dibasic acids with aliphatic or aromatic diol(s) in a reaction which might sometimes be referred to as an "esterification condensation reaction". Such esterification reactions are well known to those skilled in such art.

In practice, elastomers for said insert may be selected from, for example, cis 1,4-polyisoprene, cis 1,4-polybutadiene, styrene/butadiene copolymers, high vinyl polybutadiene containing from 35 to 90 percent vinyl 1,2-groups and isoprene/butadiene copolymers.

In practice, the present invention relates to a pneumatic tire. Pneumatic tire conventionally means a laminated mechanical device of generally toroidal shape (usually an open torus) having beads and a tread and made of rubber, chemicals, fabric and steel or other materials. When mounted on the wheel of a motor vehicle, the tire through its tread provides traction and contains the fluid that sustains the vehicle load. The present invention relates to both bias and radial-ply tires. Preferably, the present invention is a radial-ply tire. "Radial-ply" tire means a belted or circumferentially-restricted pneumatic tire in which the carcass ply cords which extend from bead to bead are laid at cord angles between 65° and 90° with respect to the equatorial plane of the tire.

For a further understanding of the invention, reference is made to the accompanying drawing.

The accompanying drawing is a cross-sectional view of a portion of a tire (1), including a portion of its carcass with included bead core (2), sidewall (3) and reinforcing carcass plies (4 and 5), together with a circumferential tread (6).

In particular, the pneumatic tire sidewall (3) contains two steel cord reinforced carcass plies (4 and 5) with a turn-up portion (5A) and a terminal end (5B).

"Steel cord" means one or more of the reinforcement elements, formed by one or more steel filaments/wires which may or may not be twisted or otherwise formed which may further include strands so formed which strands may or may not be also so formed, of which the carcass ply in the tire is comprised.

An apex (7) is in the immediate proximity of the carcass ply turn-up (5A) including the area above the bead core (2) and is encased by the carcass ply (5) and carcass ply turn-up.

In accordance with one aspect of this invention, a rubber tire is provided having an apex (7) in the region of the carcass ply turn-up (5A) as well as a sidewall insert (8) spaced apart from the bead core (2); wherein said rubber in said apex (7) and sidewall insert (8) is the above-described sulfur-cured rubber composition for this invention.

While the drawing depicts the presence of both the specified apex (7) and the sidewall insert (8), it is to be understood that the apex (7) and sidewall insert (8) may be used together in the same tire and each may be used individually in a tire construction.

For this invention, an essential component is the insert for the sidewall as a rubber composition which contains both the particulate dispersion of ultra high molecular weight polyethylene and starch composite.

Representative examples of such ultra high molecular weight polyethylenes are those obtainable as, for example, various GUR grades such as, for example, GUR 4120 a trademark of Hoechst GmbH.

In general, the ultra high molecular weight polyethylene can be utilized, for example, as a powdery polyolefin.

It is readily understood by those having skill in the art that the rubber compositions used for the insert for this invention, particularly as an apex for a tire sidewall, compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, particulate reinforcement as hereinbefore discussed, and plasticizers, fillers, pigments, fatty acid, zinc oxide, waxes, antioxidants and antiozonants and peptizing agents. As known to those skilled in the art, depending on the intended use of the sulfur-vulcanizable and sulfur-vulcanized material (rubbers), the additives mentioned above are selected and commonly used in conventional amounts unless otherwise prescribed herein.

Typical amounts of tackifier resins, if used, comprise 1 to 20 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine, polymerized 1,2-dihydro-2,2,4-trimethylquinoline and others, such as, for example, those disclosed in The *Vanderbilt Rubber Handbook* (1990), pages 343–362. Typical amounts of antiozonants comprise about 1 to about 5 phr. Representative antiozonants may be, for example, those disclosed in *The Vanderbilt Rubber Handbook* (1990), pages 363–367. Typical amounts of fatty acids, if used, which can include stearic acid comprise about 0.5 to about 3 phr. Typical amounts of zinc oxide comprise about 2 to about 10 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention, unless otherwise provided herein, which is more primarily directed to the utilization of the combination of a dispersion of particulate ultra high molecular weight polyethylene and starch composite in the rubber composition for the sidewall insert of this invention.

The vulcanization is conducted in the presence of a sulfur-vulcanizing agent. Examples of suitable sulfur-vulcanizing agents include elemental sulfur (free sulfur) or sulfur donating vulcanizing agents, for example, an amine disulfide, polymeric polysulfide or sulfur olefin adducts. Usually, the sulfur-vulcanizing agent is elemental sulfur. As known to those skilled in the art, sulfur-vulcanizing agents are used in an amount ranging from about 1.5 to about 4 phr, alternatively about 2 to about 4 phr or, even in some circumstances, up to about 8 phr. For a higher modulus for the rubber composition, sulfur in an amount of about 4 to about 6 phr might be used.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators which is generally used in the larger amount (0.5 to 1.0 phr), and a secondary accelerator which is generally used in smaller amounts (0.05 to 0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The tire can be built, shaped, molded and cured by various methods which will be readily apparent to those having skill in such art.

The prepared tire of this invention is conventionally shaped and cured by methods known to those having skill in such art.

The invention may be better understood by reference to the following examples in which the parts and percentages are by weight unless otherwise indicated.

EXAMPLE I

Rubber compositions are prepared which contain the materials shown in Table 1 which recite a Control rubber composition as Sample A as well as experimental rubber compositions as Samples B, C and D which contain, variously, a dispersion of a particulate ultra high molecular weight polyethylene (UHMWPE) and starch composite.

Ingredients, other than sulfur and accelerator(s), are mixed in sequential two non-productive mixing stages to a temperature of about 170° C. for about 5 minutes for each stage in an internal rubber mixer. All of the non-productive ingredients were introduced in the first non-productive mixing stage, or operation. The term "non-productive" means without sulfur curatives and is a term well known to those skilled in such art.

Sulfur and cure accelerator(s) were then mixed in a subsequent mix stage, often referred to as a "productive" mixing stage, in an internal rubber mixer for about 2 minutes to a temperature of about 115° C.

Table 2 reports the cure behavior and vulcanizate properties for the Control Sample A and also Samples B, C and D.

TABLE 1

| Material | Sample A (Control) | Sample B | Sample C | Sample D |
|---|---|---|---|---|
| Non-Productive Mixing (phr) | | | | |
| Natural rubber[1] | 100 | 100 | 100 | 100 |
| Coupling agent[2] | 0 | 0 | 5 | 0 |
| UHMWPE[3] | 0 | 40 | 40 | 0 |
| Starch composite[4] | 0 | 0 | 10 | 0 |
| Carbon black (N630) | 40 | 40 | 40 | 75 |
| Zinc oxide | 6 | 6 | 6 | 6 |
| Stearic acid | 1.5 | 1.5 | 2 | 2 |
| Resin(s)[5] | 0 | 0 | 0 | 20 |
| Productive Mixing (phr) | | | | |
| Sulfur | 5 | 5 | 5 | 3.8 |
| Accelerator(s)[6] | 0.7 | 0.7 | 5.5 | 5.5 |

1. Natural cis 1,4-polyisoprene rubber.
2. Coupling agent obtained as X50S, a trademark of Degussa AG as a 50/50 composite of bis(3-triethoxysilylpropyl) tetrasulfide and carbon black, therefore, the amount of actual coupling agent is 2.5 phr.

3. Ultra high molecular weight polyethylene having a molecular weight of about five million obtained as GVR 4120 a trademark of the Hoechst GmbH company.
4. A starch/plasticizer composite obtained as Mater-Bi 1128RR a trademark of the Novamont company and understood to be a composite of starch and ethylene/vinyl alcohol plasticizer.
5. The resin(s) of the resorcinol/formaldehyde type.
6. Vulcanization accelerators have been added and slightly adjusted for the different formulations.

The accelerator for Samples A and B was a butyl benzothiazole, and for Samples C and D, the accelerators used are dicyclohexyl benzothiazole and hexamethylene type.

TABLE 2

| | Properties | | | |
|---|---|---|---|---|
| Property | A (Control) | B | C | D |
| Modulus (100%), MPa | 2.3 | 6 | 9.3 | 7 |
| Modulus (300%), MPa | 12.0 | 16.3 | — | — |
| Shore A hardness | 60 | 75 | — | — |
| Shore D hardness | — | — | 42 | 42 |
| Permanent compression set (%) | 29 | 26 | 28 | 36 |
| Rebound (100° C.) | 83 | 80 | 67 | 53 |
| Elongation @ Break (%) | 472 | 381 | 210 | 200 |
| Tensile Strength (MPa) | 21.3 | 16.4 | 15 | 15 |
| Mooney viscosity | 37 | 36 | 42 | 44 |
| Specific Gravity | 1.11 | 1.07 | 1.09 | 1.19 |
| Stiffness softening (%) | 0 | −5 | −19 | −36 |

It is readily seen from Table 2 that the intermediate modulus (100 percent), as well as the larger modulus (300 percent), is readily enhanced by the presence of the micro-inclusion (dispersion) of the UHMWPE as shown by Sample B.

It is also seen that the intermediate modulus (100 percent) is further readily enhanced by the micro-inclusion (dispersion) of both the UHMWPE and the starch composite as shown by Sample C.

Further, the hardness of the rubber composition is enhanced by micro-inclusion (dispersion) of the UHMWPE and starch composite as shown by Samples B and C.

The stiffness softening was substantially reduced by the micro-inclusion (dispersion) of both the UHMWPE and the starch composite as shown by Sample C.

Further, the Shore A and Shore D hardness compared to Rebound values shown in Table 2 illustrate that addition of the ultra high molecular weight polyethylene and starch composite can provide stiff rubber compositions (hardness) values with a reduced hysteresis (Rebound) value which are considered herein to be desirable for the sidewall insert.

The specific gravity property shown in Table 2 illustrates that use of the ultra high molecular weight polyethylene can also be used to reduce the weight of the rubber composition.

It may be pointed out that a combination of the starch composite dispersion and relatively high sulfur content for Sample C was used to achieve the higher 300 percent Modulus shown in Table 2.

It is considered herein that the use of the combination of starch composite and relatively high sulfur content enabled internal stresses created by the hard inclusions of the ultra high molecular weight polyethylene to be better distributed within the rubber composition and, thereby, reduce interfacial interactions at large strains (large elongations) while maintaining sufficient tensile and elongation properties.

The stiffness softening test may be conducted, for example, as described as first determining an initial one percent shear modulus (MPa) at 100° C. After allowing the sample to relax to its original shape, the rubber sample is then stretched 50 percent in shear. After allowing the sample to relax to its original shape, a second one percent shear modulus is determined for the rubber sample. If the second one percent shear modulus for the rubber sample is substantially equal to the first determined one percent shear modulus, then the sample has a very little, if any, softening with strain history or stiffness softening. On the other hand, if the second determined shear modulus is substantially less than the value of the first determined shear modulus, then the rubber sample may be said to have its softening with strain history negatively of "adversely affected".

In Table 2, the stiffness softening values are reported as percent differences between the first shear modulus value and the second shear value as above-referenced.

While certain representative embodiments and details have been shown for the purpose of illustrating the subject invention, it will be apparent to those skilled in this art that various changes and modifications can be made therein without departing from the scope of the subject invention.

What is claimed is:

1. A toroidally-shaped pneumatic tire comprised of two spaced apart, relatively inextensible bead cores, a circumferential tread designed to be ground-contacting, sidewalls extending from said bead cores to said tread and a carcass which contains said tread and sidewalls, said carcass is comprised of at least one cord reinforced rubber ply extending from bead core to bead core; wherein an insert of a rubber composition is positioned juxtapositioned to at least one of said carcass plies in the sidewall region of the tire; characterized in that said insert is a rubber composition comprised of, based upon 100 phr of elastomer(s), (A) at least one elastomer selected from homopolymers and copolymers of conjugated diene hydrocarbons having from 4 to 6 carbon atoms and copolymers of conjugated hydrocarbons having from 4 to 6 carbon atoms and styrene, (B) about 5 to about 50 phr of a particulate ultra high molecular weight polyethylene having a weight average molecular weight in a range of about 4.5 million to about 8 million with a melting point in a range of about 130° C. to about 150° C. dispersed within said rubber composition of said insert, (C) about 5 to about 40 phr of a particulate starch/plasticizer composite dispersed within said rubber composition of said insert, and (D) about 10 to about 50 phr of at least one reinforcing filler selected from the group consisting of carbon black, precipitated silica, aluminosilicate, and modified carbon black having silanol units on its surface, (E) a coupling agent for said silica, aluminosilicate and/or modified carbon black and for said starch/plasticizer composite, respectively, wherein said coupling agent has a moiety reactive with silanol units contained on the surface of the silica, aluminosilicate and/or said modified carbon black and with hydroxyl units contained in said starch/plasticizer composite, respectively, and another moiety interactive with said elastomer(s); wherein said starch is composed of amylose units and amylopectin units in a ratio of about 15/85 to about 35/65 and has a softening point in a range of about 180° C. to about 220° C.; wherein said starch/plasticizer composite has a softening point in a range of about 110° C. to about 170° C., and where the plasticizer is a polymeric plasticizer having a softening point of less than 160° C.;

wherein said plasticizer for said starch/plasticizer composite is at least one selected from the group consisting of poly(ethylenevinyl alcohol) (EVOH), and cellulose acetate and any polymeric plasticizer able to reduce the softening point of the starch/plasticizer composite to temperatures lower than 160° C.

2. The tire of claim 1 wherein said plasticizer for said starch/plasticizer composite is selected from the group consisting of poly(ethylenevinyl alchohol) (EVOH) and cellulose acetate.

3. The tire of claim 2 wherein said insert is an apex juxtapositioned to said tire bead core between at least one carcass ply and its turn-up portion and extending radially outward into the tire sidewall region.

4. The tire of claim 3 wherein said insert has a Shore A hardness value in a range of about 70 to about 90 and a Hot Rebound value at 100° C. in a range of about 65 to about 80.

5. The tire of claim 2 wherein said insert is axially spaced apart from said bead core and is positioned in the sidewall region of the tire and juxtapositioned to and radially inward of at least one carcass ply.

6. The tire of claim 5 wherein said insert has a Shore A hardness value in a range of about 70 to about 90 and a Hot Rebound value at 100° C. in a range of about 65 to about 80.

7. The tire of claim 2 wherein said insert has a Shore A hardness value in a range of about 70 to about 90 and a Hot Rebound value at 100° C. in a range of about 65 to about 80.

8. The tire of claim 1 wherein said insert is an apex juxtapositioned to said tire bead core between at least one carcass ply and its turn-up portion and extending radially outward into the tire sidewall region.

9. The tire of claim 1 wherein said insert has a Shore A hardness value in a range of about 70 to about 90 and a Hot Rebound value at 100° C. in a range of about 65 to about 80.

10. The tire of claim 1 wherein said insert is axially spaced apart from said bead core and is positioned in the sidewall region of the tire and juxtapositioned to and radially inward of at least one carcass ply.

11. The tire of claim 10 wherein said carcass is comprised of at least two of said plies, for which, in its sidewall region, an axially innermost ply is a relatively low modulus synthetic textile cord reinforced ply, and an additional ply axially outward from said innermost ply is a high modulus cord reinforced ply and the insert is positioned juxtapositioned to and between said low and high modulus cord reinforced carcass plies.

12. The tire of claim 11 wherein said insert has a Shore A hardness value in a range of about 75 to about 90 and a Hot Rebound value at 100° C. in a range of about 65 to about 80.

13. The tire of claim 11 wherein said low modulus cord is selected from the group consisting of at least one of nylon and polyester and said high modulus cord is selected from the group consisting of at least one of aramid and steel.

14. The tire of claim 13 wherein said insert has a Shore A hardness value in a range of about 75 to about 90 and a Hot Rebound value at 100° C. in a range of about 65 to about 80.

15. The tire of claim 10 wherein said carcass is comprised of at least two of said plies, for which, in its sidewall region, an axially innermost ply is a relatively high modulus synthetic textile cord reinforced ply, and an additional ply axially outward from said innermost ply is a low modulus cord reinforced ply and the insert is positioned juxtapositioned to and between said low and high modulus cord reinforced carcass plies.

16. The tire of claim 15 wherein said insert has a Shore A hardness value in a range of about 75 to about 90 and a Hot Rebound value at 100° C. in a range of about 65 to about 80.

17. The tire of claim 15 wherein said low modulus cord is selected from the group consisting of at least one of nylon and polyester and said high modulus cord is selected from the group consisting of at least one of aramid and steel.

18. The tire of claim 17 wherein said insert has a Shore A hardness value in a range of about 75 to about 90 and a Hot Rebound value at 100° C. in a range of about 65 to about 80.

* * * * *